Aug. 19, 1941.   F. L. MYERS   2,252,724
AIR FILTER
Filed March 31, 1937   2 Sheets—Sheet 1
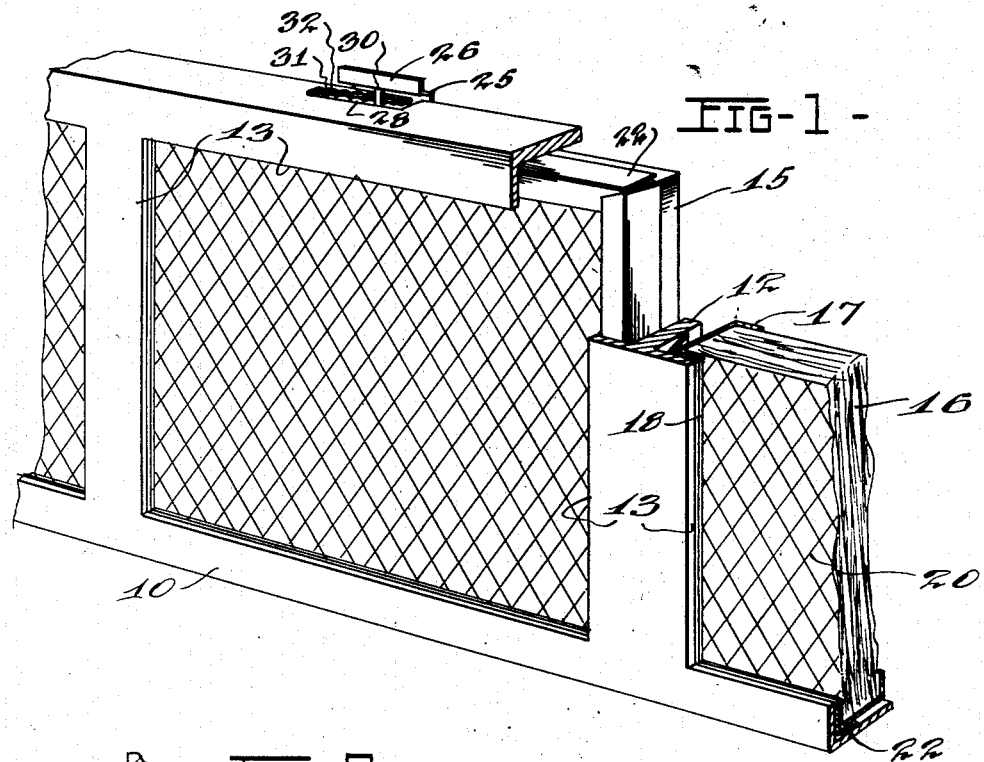
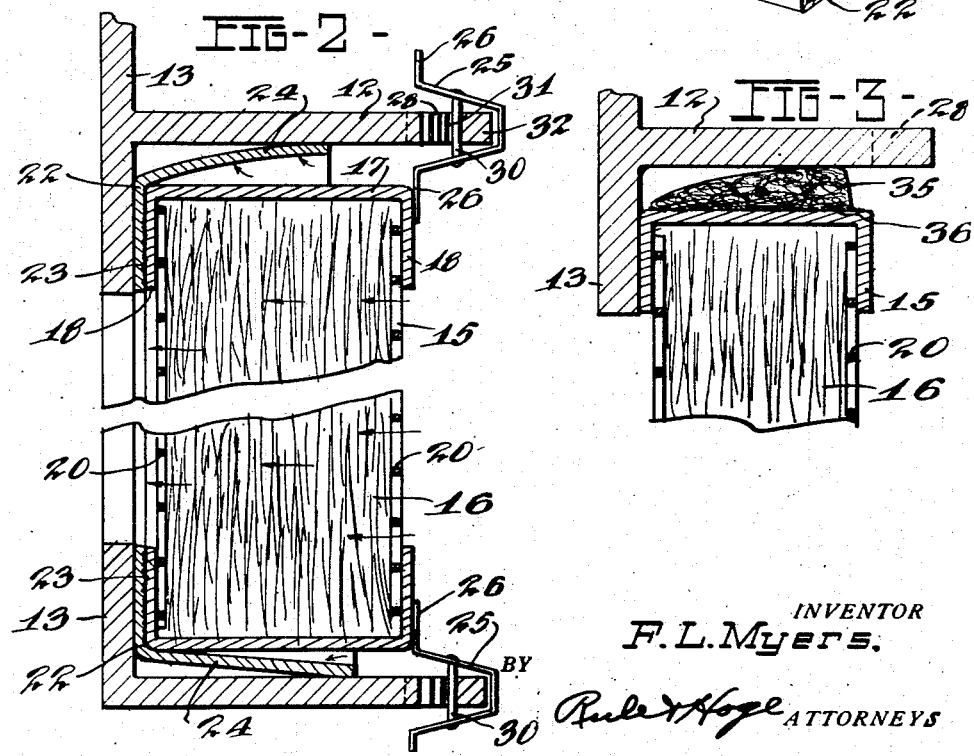
INVENTOR
F. L. Myers.
BY
Rule & Hoge ATTORNEYS Aug. 19, 1941.  F. L. MYERS  2,252,724
AIR FILTER
Filed March 31, 1937   2 Sheets-Sheet 2
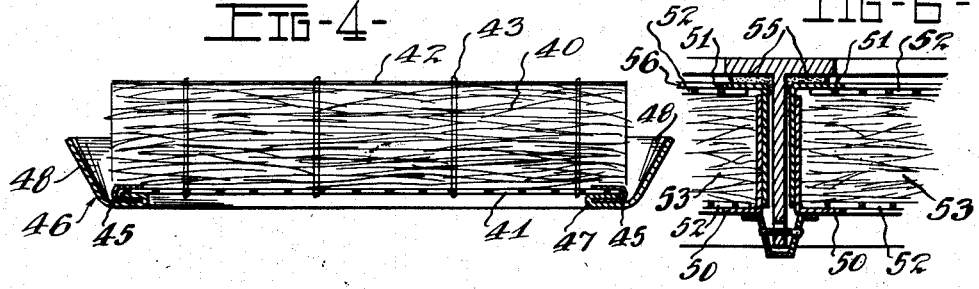
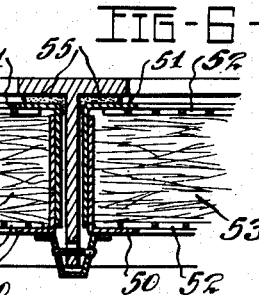
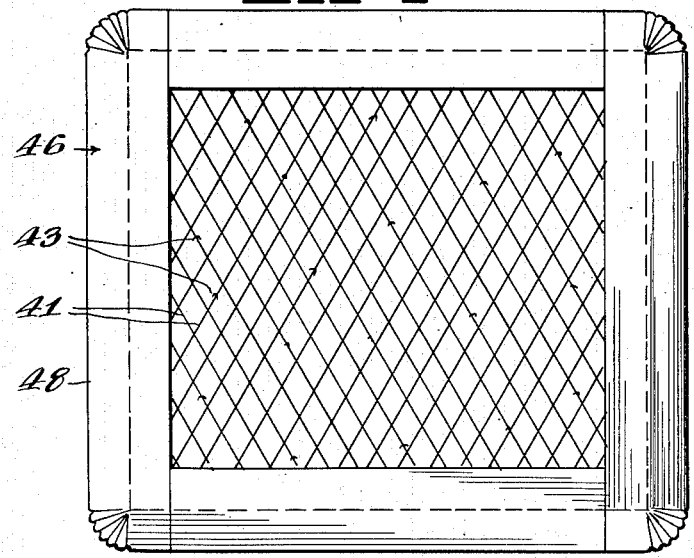
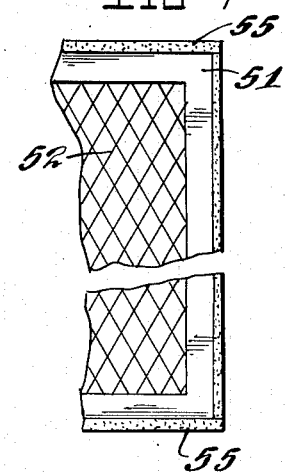
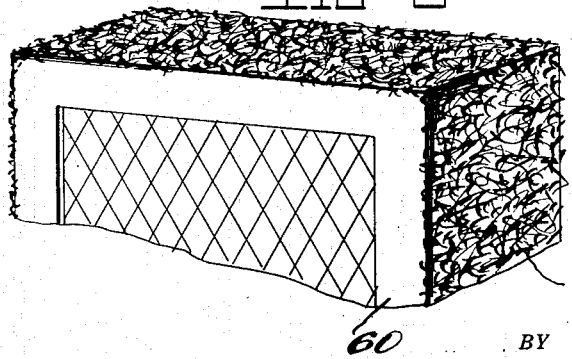
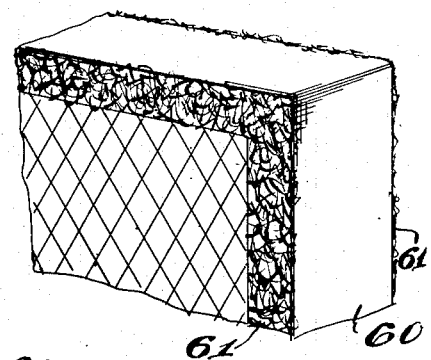
INVENTOR
F. L. Myers,
BY
Rule & Hoge ATTORNEYS Patented Aug. 19, 1941

2,252,724

UNITED STATES PATENT OFFICE 2,252,724

AIR FILTER

Frank L. Myers, Toledo, Ohio, assignor, by mesne assignments, to Owens-Corning Fiberglas Corporation, a corporation of Delaware Application March 31, 1937, Serial No. 134,101

8 Claims. (Cl. 183—44)

The present invention relates to air filter units and more particularly to means for forming an air seal around the margins of a unit in order to prevent the passage and escape of air around the outer margins of the filter unit. The invention also relates to certain novel means for forming a gasket in combination with a filter unit and the frame adapted to hold said filter unit in place.

One of the objects of the invention is to provide a filter unit which may be quickly and easily fitted into place regardless of the usual tolerances and inaccuracies in the manufacture of the filter unit and to provide a tight air seal therefor.

Another object of the invention is to provide an individual gasket for each filter unit which may be thrown away and discarded at the end of the life of the filter unit, to the end that each filter unit is provided with its own individual gasket which will be new and fresh and pliable, and capable of adapting itself to the particular irregularities or deformities of itself and the filter frame. Thus old gaskets which have been in use with another filter unit and which may have been deformed in accordance with the peculiarities or irregularities of the prior filter unit, will be replaced with the new filter unit.

Another object of the invention is to provide in combination with a filter unit, means for utilizing the differential of air pressure on opposite sides of the filter unit to assist in providing an air seal around the margins of the filter unit.

Another object of the invention is to provide a novel method and means for applying gaskets to the individual filter units.

Other objects and advantages of the present invention will become apparent from the following description taken in conjunction with the drawings, in which:

Fig. 1 is a perspective fragmentary view of a filter frame having a plurality of filter cells, each having installed therein a filter unit made in accordance with the present invention;

Fig. 2 is a fragmentary cross-sectional view of a filter frame and installed unit made in accordance with the present invention;

Fig. 3 is a fragmentary cross-sectional view of a modified embodiment of the present invention as applied to a filter unit;

Fig. 4 is a cross-sectional view of a filter unit incorporating a modification of the structures shown in Figs. 1 to 3;

Fig. 5 is a front view of the filter unit shown in Fig. 4 looking at the intake face of the unit;

Fig. 6 is a fragmentary cross-sectional view of another modified embodiment of the present invention shown inserted in a conventional filter frame;

Fig. 7 is a fragmentary rear elevational view of the filter unit shown in Fig. 6 looking at the discharge face of the unit;

Fig. 8 is a fragmentary perspective view of another embodiment of the present invention; and Fig. 9 is a perspective view of still another modification.

In applying gaskets to air filter frames, it has been conventional to apply a strip of gasketing material against the back flange of the frame and then to press a gasketless filter unit against this gasket by a locking member which was intended to prevent leakage around the filter. When the filter unit, however, is removed and a new one inserted, it frequently is of a slightly different size and shape, caused by inaccuracies of manufacture which inherently creep into this type of construction. The filter gasket, however, will have been compressed by the first filter unit and will have been conformed to all the irregularities, bulges, or crevices of the first unit. When the second unit is installed, it is not uncommon for the efficiency of the gasket to be markedly decreased whereby a large portion of air leaks through the crevices in the gasket and destroys the filtering effect of the filter unit. As a matter of fact, the main portion of the dust which escapes past filter units is that dust which is carried by the air which leaks around the filter units and past the gasket which may be provided on the filter frame flanges.

In accordance with my invention, I propose to provide a combined filter unit and gasket in which the gasket is attached to the filter unit when constructed, so that the unit is adapted to be applied to any filter frame regardless of tolerances or inaccuracies of manufacture. After the filter unit has become clogged with dirt and lost its efficiency, it may be discarded along with the gasket and a new filter unit with attached gasket installed in its place.

Another feature of the invention is the provision of a gasket which is attached to the margins of the filter unit and which extends laterally beyond the margins thereof and beyond the normal dimensions of the filter unit to provide an overhang and additional air seal with the filter cell of the frame. When a filter unit with such a gasket is installed in a conventional filter frame, the outer extremities of the gasket drag along and press against the side walls of the frame or cell into which the unit is placed and produce a so-called pump sucker effect against the sides of the frame. With such a construction, an excellent air seal is effected in spite of various irregularities or warpings which may exist in the flanges or walls of the filter frame.

Referring particularly to Figs. 1 and 2, I have illustrated a filter frame 10 which may be built up to provide a plurality of individual cells for filter units which may be, for example, similar to those illustrated and described in the patent to Collins, No. 1,898,424, or in the patent to Myers and Smith, No. 2,044,221. The individual cells of the filter frame 10 are provided with quadrilaterally arranged side walls 12 and inwardly extending flanges 13 around the margins of the cell.

A filter unit 15 fits into said cell and bears against the inwardly extending flanges 13. The filter unit 15 may be constructed in various approved manners and may comprise a body of matted fibers such as glass wool 16, coated with an oily or viscous dust catching material. The particular coating and the type of fibrous material does not form a part of the invention as we may use any suitable or approved form of such material. The body of fibrous material is ordinarily supported in an envelope, carton, or open container 17 around the periphery of the unit 15. The cross-section of the margin of said carton is generally U-shaped, having inwardly extending flanges 18 which bear against the flanges 13. The open grills or screens 20 overlie the face of the filter unit and are fastened to the flanges 18. The grills may be fastened to the flanges 18 by any suitable means such as adhesives, staples (not shown) or the like.

Fastened to the inner face of the filter unit around the margins thereof, and more generally to the flanges 18 as illustrated in Fig. 2, is a gasket 22 composed of any suitable soft material such as felt, cotton, cloth, tape, rubber, asbestos, or the like. The gasket 22 may be fastened to the flanges 18 by any suitable means such as adhesives 23 or the like. As shown in Fig. 2 the gasket extends outwardly from the filter unit to provide the overhanging edges or lips 24, having total outer dimensions from extremity to extremity of the filter unit which are greater than the total dimensions of the cell into which the unit is to be installed.

Thus when the filter unit is installed within the cell of the filter frame, the edges or lips 24 are folded backwardly and made to bear against the side walls 12. As the lips 24 are bent backwardly, they inherently bear against the side walls 12 with increased pressure and thus form an efficient, constant and dependable air seal. It is also to be noted that owing to the differential of pressure on each side of the filter unit, the increased air pressure on the intake side of the unit will cause the lips 24 to bear more heavily against the side walls 12 and thus insure an increased sealing effect. Thus the lips 24 produce what may be termed a pump sucker effect and a consequent more efficient seal.

The units may be retained in position by means of a retaining bar 25 which may be made of sheet metal and comprises a U-shaped body which slidably engages the free margin of the horizontal frame member 12, and retaining strips 26 extending outwardly from the free edges of the U-shaped member, adapted to bear against the intake margins of the unit 15 and more particularly against the flanges 18. The frame member or side walls 12 are each formed with a slot 28 extending inwardly from the free edge of the frame member and diagonally thereof, as shown in Fig. 1, so that the slot forms an acute angle with the said free edge. A holding pin 30 extending through the body of the retaining bar 25 centrally thereof, and riveted or otherwise secured thereto, is adapted to enter the slot 28, thereby holding the retaining strip 26 in position to bear against the intake faces of the adjacent filter units. The forward edge 32 of the slot 28 is preferably formed with corrugations or teeth 31 (see Fig. 1) which are preferably in the form of rounded lugs adapted to securely hold the retaining strips 26 against accidental movement.

The corrugations 31 effectually prevent any accidental shifting of the retaining bar 25 which would loosen the filter unit, while at the same time permitting instantaneous removal of said bar when it is desired to remove the filter units for replacement or other purposes.

Referring more particularly to Fig. 3, I have illustrated a modified embodiment of the present invention in which a gasket having a wedge-shaped cross-section has been applied around the margins of the filter unit. This material may be composed of felt, rubber, paper, textile fabric, hair, or other suitable yielding and compressible material. This material may be coated or impregnated with a suitable binder such as latex, starch, casein, agar agar, glue, asphalt, etc., although I preferably provide a yielding substance such as latex or rubber in order to provide a constant compressibility and pressure against the walls 12 of the cell into which the filter unit is placed. The gasket 35 may be secured to the outer or peripheral margins of the filter unit by any suitable means such as an adhesive 36 of any desired type, such as casein, sodium silicate, glue, starch, asphalt, or other suitable binder.

By provision of the gasket 35 extending outwardly from the sides of the filter unit 15 and preferably for a total distance somewhat greater than the distance between the walls 12 and the adjacent sides of the filter units, I have provided an efficient air seal which is not dependent upon a constant pressure of the unit against the flanges 13, but is provided with a continual pressure against the walls 12 owing to the inherent compressibility and elasticity of the gasket 35. Retaining bars may be provided, however, to fit in the slots 28 in order to hold the units securely in place. These retaining bars may be of a type and construction similar to the bars 25 illustrated in Fig. 2.

In Figs. 4 and 5 I have illustrated another embodiment of the present invention in which a fibrous mat 40 composed of glass wool, mineral wool, hair, wood fibers, metal wool, or the like, has a metal mesh or screen 41 overlying the discharge face thereof. A second screen or metal mesh 42 may be applied to the intake face in order to hold the fibrous material more firmly in place. The second screen 42 need not be added, however, if the fibrous material has sufficient mass integrity and strength in and of itself. The screens 41 and 42 may be fastened or sewed together by stitching, clamps or other holding means 43, this permitting the two screens and faces of the filter unit to be definitely spaced a predetermined distance apart. Around the margins of the screen 41 are clamping strips 45 preferably having a U-shaped cross-section and adapted to hold in place peripheral gaskets 46, the inner edges 47 of which are interfolded with the clamping strips 45 and are thus held securely in place adjacent the screen 41. The free edge 48 of the gasket extends outwardly beyond the filter unit and acts, in combination with a filter frame, as a seal in a manner similar to that illustrated and described in Figs. 1 and 2. Thus when the filter unit is inserted within a cell of a suitable filter frame, the free edges 48 are folded back and are held yieldingly against the side walls of the cell and thus insure a constant and efficient air seal. It will be noted that with this arrangement an individual carton surrounding the margins of the filter unit will be unnecessary, and may be eliminated, thus reducing the cost of the filter units materially.

Figs. 6 and 7 illustrate a further embodiment of the present invention in which a single gasket may be applied to the inner face of a filter unit and which may be provided with sufficient overhang extending beyond the edges of the filter unit in each direction in order to provide an automatic positive air seal.

In the drawings reference characters 50 and 51 designate two telescopic halves of a filter carton having open faces on each side thereof which are preferably covered with openwork grills 52. Within the carton may be any suitable filtering material 53, such as glass wool, hair, wood pulp, metal wool, or the like, which is preferably coated with a suitable filter adhesive adapted to catch dust particles which impinge thereon. Around the margins of the inner face of the filter unit is provided a compressible, resilient gasket 55 composed of felt, paper, cloth, rubber, or other suitable material. The gasket 55 may be cut out integrally from a single sheet of material in quadrilateral arrangement, or may be built up of suitable straight strips along each edge as desired. In applying the gasket to the filter unit it may be secured thereto by any suitable means such as adhesives, or the like. The thickness of the gasket is preferably about $\frac{1}{32}$ inch to about $\frac{1}{8}$ inch and extends beyond the edges of the unit for only a short distance, say about $\frac{1}{8}$ or $\frac{1}{4}$ inch as required by the particular dimensions of the frame cell.

Thus, the gaskets 55 are preferably provided with a slight overhang extending beyond the edges of the filter units. The total distances between opposite free edges of the gasket at opposite lateral edges of the filter units are preferably slightly greater than the corresponding dimensions of the filter cell into which the unit is to be placed. The excess thereover is to include all the tolerances and possible inaccuracies in fabricating the filter frame cells and filter units, and a little extra to provide a tight bearing against the cell walls, and a positive air seal. It will be noted that there is thus produced a lateral compression force in the gasket, or at least the free edges thereof, extending in the plane of the face of the filter unit. The forces prevailing at opposite edges of the filter units, bear against and neutralize each other, thus causing a constant bearing pressure against the sides of the filter frame cells or walls 56. Moreover, this increased bearing pressure prevails around the entire periphery of the filter unit and is not deleteriously affected by warping of the unit or a slackening of the pressure provided by the retaining bar 25.

Figs. 8 and 9 illustrate a further modification of the present invention directed to a novel air filter gasket and a novel method of applying the same to a filter unit. The filter units 60 may be of any suitable design as, for example, those illustrated and described in a general way in Figs. 1 to 7, with the exception of the gaskets thereof. The gasket may be applied to either or both the intake and discharge faces of the filter unit as shown in Fig. 9, preferably the discharge face of the filter unit, or it may be applied to the marginal sides thereof, as shown in Fig. 8.

In applying the gasket to the filter unit 60, those portions to which the gasket is to be applied are preferably painted or otherwise supplied with a suitable tacky substance such as asphalt, sodium silicate, glue, casein, starch, agar agar, latex, etc., or other suitable substance. To the tacky substance may then be applied any suitable subdivided, fibrous, pulverized or shredded material 61 such as shredded felt or pulverized blotting paper material, ground rubber, sponge rubber, fibrous material, asbestos, hair, cotton, or the like. The subdivided or shredded material 61 adheres to the tacky surface which then dries and forms a gasket on the border of the filter.

Successive coatings may be applied to build up the depth of the gasket, so as to provide a more efficient seal than might be obtained by merely a single application. In addition, the applications may be built up in wedged form as, for example, such as that illustrated in Fig. 3.

Modifications and variations may be resorted to without departing from the spirit and scope of the invention as defined in the appended claims.

I claim:

1. An air filter unit comprising an air filtering medium, a circumferential holding means for said medium, and gasket material adhesively secured to said means and extending outwardly beyond the entire face circumference of said means.

2. An air filter unit comprising a mass of fibrous material, a supporting grill overlying one face of said fibrous material and defining the air discharge face thereof, and a gasket of sheet material secured solely along one of its margins to the periphery of said unit and extending outwardly uniformly beyond the said periphery to provide an overhanging free edge throughout its length.

3. An air filter unit comprising a carton having inlet and outlet openings respectively in the faces thereof for the passage of air, filtering material within said carton, and a gasket of sheet material fastened at one of its margins to the circumference of said carton around the periphery of the outlet face and extending outwardly uniformly beyond the periphery of the outlet face of said carton in directions having components parallel to the said face to provide an overhanging free edge, said gasket adapted to yieldingly contact and bear outwardly against the side walls of a cell of a filter frame into which said unit is placed with said gaskets adapted to be urged against said side walls by the differential in air pressure between the opposite faces of the unit.

4. A filter unit which comprises a rectangular container having inlet and exhaust ports in the faces thereof, inlet and exhaust grills enclosing said ports, and a gasket fastened around the margins of one face of said filter unit and extending outwardly beyond the said margins in directions having components parallel to said faces to provide an overhanging free edge adapted to yieldingly contact and bear against the side walls of a filter frame into which said unit is inserted.

5. A filter unit which comprises a rectangular container having inlet and exhaust ports in the faces thereof, inlet and exhaust grills enclosing said ports, and a gasket fastened around the margins of one face of said filter unit and extending outwardly beyond said margins in directions having components parallel to the said faces to provide an overhanging free edge, said gasket being formed of a soft yieldable and compressible material and having overall dimensions, between opposite free edges of said gasket at opposite sides of said filter unit, larger than the inner dimensions of the cell of the filter frame into which the unit is to be placed.

6. An air filter unit having a rectangular shape, and a gasket around the margins thereof and secured thereto and extending outwardly beyond the said margins in directions having components parallel to the major face of said unit, said gasket being composed of a mass of subdivided material having a compressible yielding texture cemented to said margins.

7. A filter unit comprising a frame having sides, said frame being adapted to contain filtering means, sealing flaps respectively attached to respective sides, each sealing flap comprising a continuous strip, an angled portion of the strip, the strip on one side of the angled portion being attached to the frame and the strip on the other side of the angled portion being free of the frame and movably related thereto.

8. A filter unit comprising a frame having sides, said frame being adapted to contain a filtering means, sealing flaps respectively attached to the respective sides, each sealing flap comprising a continuous angled strip, the strip on one side of the angled portion being attached to a side of the frame and the strip on the other side of the angled portion being free of the frame, said free portion of the strip having a flexible relation with respect to the frame.

FRANK L. MYERS.